United States Patent
Zhou et al.

(10) Patent No.: US 12,411,627 B2
(45) Date of Patent: Sep. 9, 2025

(54) TRANSPARENT BLOCK DEVICE COMPRESSION USING HASH-TABLE

(71) Applicant: Lemon Inc., Grand Cayman (KY)

(72) Inventors: Ping Zhou, Los Angleles, CA (US); Chaohong Hu, Los Angeles, CA (US); Kan Frankie Fan, Los Angeles, CA (US); Fei Liu, Los Angeles, CA (US); Longxiao Li, Los Angeles, CA (US); Hui Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 35 days.

(21) Appl. No.: 18/099,750

(22) Filed: Jan. 20, 2023

(65) Prior Publication Data

US 2024/0248625 A1    Jul. 25, 2024

(51) Int. Cl.
    *G06F 3/06*     (2006.01)

(52) U.S. Cl.
    CPC .......... *G06F 3/0641* (2013.01); *G06F 3/0608* (2013.01); *G06F 3/067* (2013.01)

(58) Field of Classification Search
    CPC .............................. G06F 3/0608; G06F 3/067
    USPC ........................................................ 711/101
    See application file for complete search history.

(56) References Cited

U.S. PATENT DOCUMENTS

| | | | | |
|---|---|---|---|---|
| 2015/0242309 A1* | 8/2015 | Talagala | ................... | G06F 3/064 |
| | | | | 711/103 |
| 2016/0004715 A1* | 1/2016 | Amit | ..................... | G06F 3/0676 |
| | | | | 707/693 |
| 2017/0336981 A1* | 11/2017 | Garcia | .................. | G06F 3/0673 |
| 2018/0210841 A1* | 7/2018 | Yang | ................... | G06F 12/0292 |
| 2018/0217777 A1* | 8/2018 | Jiang | .................... | G06F 3/0608 |
| 2019/0065392 A1* | 2/2019 | Erez | .................... | G06F 12/0246 |
| 2023/0153287 A1* | 5/2023 | Stephens | ............. | G06F 16/2282 |
| | | | | 707/737 |

* cited by examiner

*Primary Examiner* — Jared I Rutz
*Assistant Examiner* — Wei Ma
(74) *Attorney, Agent, or Firm* — Faegre Drinker Biddle & Reath LLP

(57) ABSTRACT

Systems and methods for accessing block storage devices are provided. In particular, a computing device may receive a write request including an uncompressed data and an uncompressed block address associated with the uncompressed data, generate compressed data by compressing the uncompressed data, determine a plurality of mapping candidates of compressed data blocks in the block storage devices based on the uncompressed block address, select a compressed data block from the plurality of mapping candidates that has sufficient capacity to store the compressed data, write the compressed data to the selected compressed data block, update metadata of the selected compressed data block to link the uncompressed block address to a compressed block address of the selected compressed data block, and write the selected compressed data block back to a respective block storage device of the block storage devices.

19 Claims, 8 Drawing Sheets

TRANSPARENT BLOCK DEVICE COMPRESSION USING HASH-TABLE

BACKGROUND

Cloud-based block storage device is a widely used product offered by Cloud Service Providers (CSPs). Cloud-based block storage, also known as block-level storage, is a data storage technology that enables fast access to data for processing and transportation. Cloud block storage works by dividing and organizing sets of raw data into individual blocks with dedicated addresses. Additionally, block storage devices include a transparent block device level compression feature, which allows compressed files to be read and written similar to uncompressed files. For example, when uncompressed data is received from a server, the uncompressed data may be compressed to be stored in the block storage devices. Since compressed data block has variable length, there is a non-linear mapping between compressed block address (i.e., a physical block address on the block storage devices) and uncompressed block address (i.e., a logical block address presented to the server). Thus, the mapping between the uncompressed block addresses and compressed block addresses must be maintained and tracked carefully. To do so, a flat mapping table may be used to map an uncompressed block address within the associated block storage device to a corresponding uncompressed block address. However, since the flat mapping table is addressed directly using the uncompressed block address, the flat mapping table may be huge in size. As such, utilizing the flat mapping table scheme for transparent block device compression may demand high memory cost and reduction in performance.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

The present disclosure relates to cloud-based block storage. More particularly, the present disclosure teaches a transparent block device compression mapping scheme to map between an uncompressed block address of an uncompressed data and a compressed block address where compressed data of the uncompressed data is being stored in the cloud-based block storage.

In accordance with at least one example of the present disclosure, a method for accessing block storage devices is provided. The method includes receiving a write request including an uncompressed data and an uncompressed block address associated with the uncompressed data; generating compressed data by compressing the uncompressed data; determining a plurality of mapping candidates of compressed data blocks in the block storage devices based on the uncompressed block address; selecting a compressed data block from the plurality of mapping candidates that has sufficient capacity to store the compressed data; writing the compressed data to the selected compressed data block; updating metadata of the selected compressed data block to link the uncompressed block address to a compressed block address of the selected compressed data block; and writing the selected compressed data block back to a respective block storage device of the block storage devices In accordance with at least one example of the present disclosure, a computing device for accessing block storage devices is provided. The computing device may include a processor and a memory having a plurality of instructions stored thereon that, when executed by the processor, causes the computing device to: receive a write request including an uncompressed data and an uncompressed block address associated with the uncompressed data; generate compressed data by compressing the uncompressed data; determine a plurality of mapping candidates of compressed data blocks in the block storage devices based on the uncompressed block address; select a compressed data block from the plurality of mapping candidates that has sufficient capacity to store the compressed data; write the compressed data to the selected compressed data block; update metadata of the selected compressed data block to link the uncompressed block address to a compressed block address of the selected compressed data block; and write the selected compressed data block back to a respective block storage device of the block storage devices In accordance with at least one example of the present disclosure, a non-transitory computer-readable medium storing instructions for accessing block storage devices is provided. The instructions when executed by one or more processors of a computing device, cause the computing device to: receive a write request including an uncompressed data and an uncompressed block address associated with the uncompressed data; generate compressed data by compressing the uncompressed data; determine a plurality of mapping candidates of compressed data blocks in the block storage devices based on the uncompressed block address; select a compressed data block from the plurality of mapping candidates that has sufficient capacity to store the compressed data; write the compressed data to the selected compressed data block; update metadata of the selected compressed data block to link the uncompressed block address to a compressed block address of the selected compressed data block; and write the selected compressed data block back to a respective block storage device of the block storage devices.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
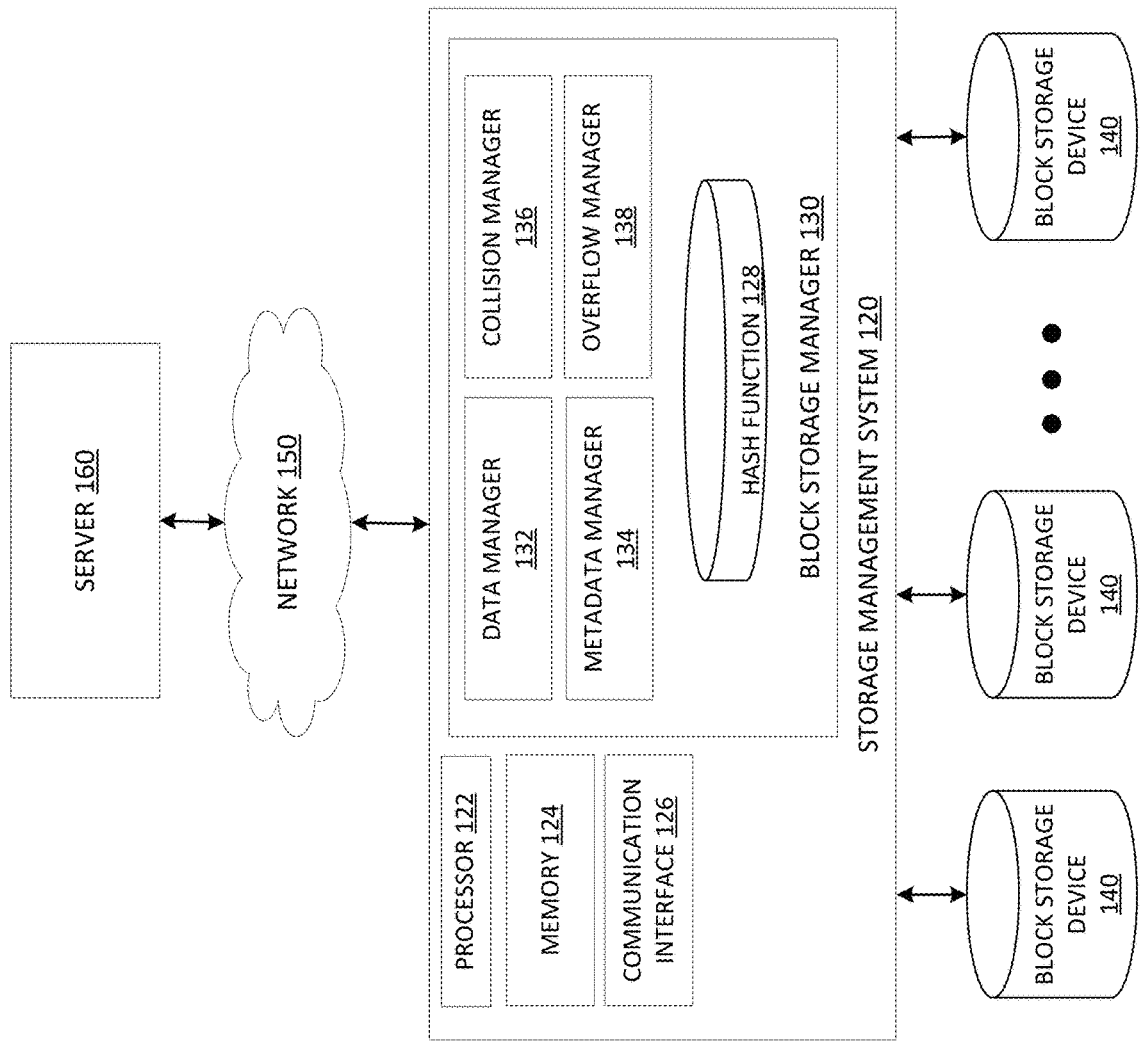
FIG. 1 depicts a block diagram of an example of an operating environment in which a cloud-based block storage may be implemented in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Cloud-based block storage device is a widely used product offered by Cloud Service Providers (CSPs). Cloud-based block storage, also known as block-level storage, is a data storage technology that enables fast access to data for processing and transportation. Cloud block storage works by dividing and organizing sets of raw data into individual blocks with dedicated addresses. Additionally, block storage devices include a transparent block device level compression feature, which allows compressed files to be read and written similar to uncompressed files.

For example, when uncompressed data is received from a server, the uncompressed data may be compressed to reduce the size of the data to be stored in the block storage devices. Since compressed data has variable length, there is a non-linear mapping between compressed block address (i.e., a physical block address on the block storage devices) and uncompressed block address (i.e., a logical block address presented to the server). Thus, the mapping between the uncompressed block addresses and compressed block addresses must be maintained and tracked carefully. To do so, a flat mapping table may be used to map an uncompressed block address within the associated block storage device to a corresponding uncompressed block address. However, since the flat mapping table is addressed directly using the uncompressed block address, the flat mapping table may be huge in size. As such, utilizing the flat mapping table scheme for transparent block device compression may demand high memory cost and reduction in performance.

For example, assuming each 4 KB uncompressed address uses a 64B mapping entry, managing 64 TB storage space will require a mapping table of 128 GB. It will be too costly to fit in DRAM. Since compressed mapping table (CMT) cannot fit in a storage space in the server, it may only be stored on the block storage devices and partially cached in the server. This may lead to performance issues as most of the inputs/outputs (I/Os) will require an extra read from the block storage devices. For example, a 4 GB CMT cache can cover 2 TB of storage space. If the storage space being managed (compressed) is 64 TB, the hit rate of CMT cache will be only 3.1% (2/64) under random I/O. This means nearly every I/O will require an extra read from the block storage devices. Additionally, caching CMT in the server is not scalable either. The size of CMT is fixed (e.g., determined by the server resource), while the storage space being compressed could vary. With storage space growing larger (e.g., more block storage devices are attached), the hit rate of CMT cache may drop proportionally, leading to even worse performance.

In accordance with examples of the present disclosure, a transparent block device compression mapping scheme allows an uncompressed block address of an uncompressed data to be mapped to a compressed block address where compressed data of the uncompressed data is being stored in the cloud-based block storage. To do so, multiple mapping candidates of compressed data blocks of the block storage devices may be determined based on the uncompressed block address of the uncompressed data using multiple predetermined hash functions. In other words, each mapping candidate corresponds to a compressed block address of a compressed data block, and the compressed block address is calculated from the uncompressed block address using a predetermined hash function. It should be appreciated that the multiple mapping candidates may be evaluated concurrently to identify a compressed data block capable to store the compressed data. Additionally, based on the capacity of the available storage in each mapping candidate, the compressed data may be stored in multiple locations. In such cases, metadata of the compressed data blocks are used to track the uncompressed block addresses that are mapped to the compressed block addresses and the allocation information of the compressed data.

FIG. 1 depicts a cloud-based block storage system 100 for providing block storage in accordance with examples of the present disclosure. To do so, the cloud-based block storage system 100 includes one or more block storage devices 140, a storage management system 120, and a server 160 that is communicatively coupled to the storage management system 120 via a network 150. The network 150 may include any kind of computing network including, without limitation, a wired or wireless local area network (LAN), a wired or wireless wide area network (WAN), and/or the Internet. It should be appreciated that the block storage devices 140 is configured to store data blocks, and each data block is assigned a unique block address.

The storage management system 120 is communicatively coupled to the server 160 and the block storage devices 140. The storage management system 120 includes a processor 122, a memory 124, a communication interface 126, and a block storage manager 130. The block storage manager 130 is configured to control and manage block storage devices 140 (e.g., in cloud-based storage environments). For example, the block storage manager 130 manages write and read requests to and from the block storage devices 140. To do so, the block storage manager 130 further includes a data manager 132, a metadata manager 134, a collision manager 136, and an overflow manager 138.

The data manager 132 is configured to control and manage access to the block storage devices 140. For example, the data manager 132 is configured to receive a write request to the block storage devices 140. The write request may be received from an application running on the host of the cloud-based block storage (e.g., the server 160). The write request includes an uncompressed data and an uncompressed block address associated with the uncompressed data. The uncompressed block address is a logical block address (LBA) of the uncompressed data stored in a source and is presented to the server 160. Subsequent to receiving the uncompressed data, the data manager 132 is configured to perform transparent compression on the uncompressed data to reduce the size of the uncompressed data to be stored in the block storage device 140. The transparent compression is performed at the block device level and is transparent to the server 160.

The data manager 132 is further configured to receive a read request for data stored in the block storage devices 140. The read request includes an uncompressed block address associated with the requested data. For example, the data manager 132 may receive a read request from an application running on the server 160 to access data from the block storage devices 140.

The collision manager 136 is configured to determine multiple mapping candidates of compressed data blocks of the block storage devices 140 to store new compressed data. To do so, the collision manager 136 uses multiple predetermined hash functions to determine multiple mapping candidates using an uncompressed block address of an uncompressed data, in which the new compressed data is derived from. In other words, each mapping candidate corresponds to a compressed block address of a compressed data block, and the compressed block address is calculated from the uncompressed block address using a predetermined hash function. The predetermined hash functions are stored in the database 128. In some aspects, other algorithms may be implemented to determine the mapping candidates based on the uncompressed block address. The collision manager 136 is further configured to evaluate each of the mapping candidates to select a compressed data block that is capable of adequately store the new compressed data. For example, the collision manager 136 is further configured to determine whether the mapping candidates have sufficient capacity to store the new compressed data. It should be appreciated that the collision manager 136 may read and evaluate the multiple mapping candidates simultaneously if they reside in different block storage devices 140.

The overflow manager 138 is configured to manage overflow data if none of the mapping candidates has sufficient capacity to store new compressed data. The overflow data may be stored in a reserved overflow space or in an additional data block in the block storage devices 140. To do so, the overflow manager 138 is configured to determine whether there is a reserved overflow space in the block storage devices 140. If the reserved overflow space exists, the overflow manager 138 is configured to write the entire new compressed data in the reserved overflow space. However, if a reserved overflow space does not exist in the block storage devices 140 or the reserved overflow space is full, the overflow manager 138 is configured to divide the new compressed data into two portions based on the available storage of a selected compressed data block. For example, the overflow manager 138 may select a compressed data block from the multiple mapping candidates that has the most capacity (i.e., the most available storage). The overflow manager 138 is configured to write a first portion of the compressed data to the selected compressed data block. The overflow manager 138 is further configured to determine an additional compressed block that has a sufficient capacity to store the remaining portion of the new compressed data. The overflow manager 138 is further configured to write the remaining portion of the new compressed data to the additional compressed block. However, it should be appreciated that, in some aspects, the new compressed data may be divided into multiple pieces and are stored in multiple compressed data blocks.

The metadata manager 134 is configured to manage metadata of compressed data blocks of the block storage devices 140. Each compressed data block includes compressed data and metadata that tracks the uncompressed block addresses that are mapped to the compressed block address of the corresponding compressed data block and the allocation information of the compressed data. The metadata may include several metadata entries, and each metadata entry may include various fields. For example, the metadata entry may include a flag field that indicates a type of the metadata entry and/or an uncompressed address field for matching with a read/write request.

For example, if the entire compressed data of an uncompressed data is stored in a compressed data block, the metadata entry of the compressed data block may include the uncompressed block address and a bitmap for space allocation in the compressed data block.

In case of overflow, the metadata manager 134 may update the uncompressed address field with a pointer to the next compressed address or the offset in the overflow area. The metadata entry may further include an allocation bitmap field and/or a next metadata field. The allocation bitmap field is a bitmap of where the compressed data is stored. The next metadata field may indicate whether the compressed data is divided into two parts, and if so, the metadata manager 134 may update the next metadata field to include a pointer to the next metadata entry that stores the remaining part of the compressed data. It should be appreciated that the size of the metadata entry may be predefined. In some aspects, the size of the metadata entry may be modified by the host of the cloud-based block storage.

For example, as described above, if there is a reserved overflow space, the entire compressed data of the uncompressed block address may be stored in the reserved overflow area. In this case, the metadata manager 134 may update the next metadata field of a selected compressed data block to point to another metadata entry within the compressed data block that has the offset into the overflow area. It should be appreciated that the selected compressed data block may be randomly selected from the multiple mapping candidates. Alternatively, a compressed data block that has the most capacity (i.e., the most available storage) among the multiple mapping candidates may be selected.

If there is no reserved overflow space or the reserved overflow space is full, the new compressed data may be divided into two parts and stored in two compressed data blocks. In this case, the first part is stored in the selected compressed data block, and the metadata manager 134 may update the next metadata field of the metadata entry of the selected compressed data block to point to another metadata entry within the selected compressed data block that points to the next compressed data block that has the remaining part of the new compressed data.

Referring now to FIGS. 2A-2D, a method for writing an uncompressed data associated with an uncompressed block address to one or more block storage devices as compressed data based on the uncompressed block address in accordance with examples of the present disclosure is described. A general order for the steps of a method 200 is shown in FIGS. 2A-2D. Generally, the method 200 starts at 202 and ends at 244. The method 200 may include more or fewer steps or may arrange the order of the steps differently than those shown in FIGS. 2A-2D. The method 200 can be executed as a set of computer-executable instructions executed by a computer system and encoded or stored on a computer readable medium. In the illustrative aspect, the method 200 is executed by a block storage manager (e.g., 130). However, it should be appreciated that aspects of the method 200 may be performed by one or more processing devices that are capable of communicating with a host of the cloud-based block storage (e.g., the server 160) and one or more block storage devices (e.g., 144). Further, the method 200 can be performed by gates or circuits associated with a processor, Application Specific Integrated Circuit (ASIC), a field programmable gate array (FPGA), a system on chip (SOC), a neural processing unit, or other hardware device. Hereinafter, the method 200 shall be explained with reference to the systems, components, modules, software, data structures, user interfaces, etc. described in conjunction with FIGS. 1 and 4-6.

The method 200 starts at 202, where flow may proceed to 204. At 204, the block storage manager 130 receives a write request to the block storage devices 140. The write request includes an uncompressed data and an uncompressed block address associated with the uncompressed data. For example, the write request may be received from an application running on the server 160. As described above, the uncompressed block address is a logical block address (LBA) of the uncompressed data. At 206, the block storage manager 130 compresses the uncompressed data.

At 208, the block storage manager 130 determines multiple mapping candidates in one or more compressed data blocks to store the compressed data based on the uncompressed block address. To do so, in the illustrative embodiment, the block storage manager 130 uses multiple predetermined hash functions to determine corresponding mapping candidates. In other words, each mapping candidate is a compressed block address space in a compressed data block and represents the uncompressed block address where the uncompressed data is stored. However, in some aspects, other algorithms may be implemented to determine the mapping candidates. The block storage manager 130 evaluates each of the mapping candidates to select a compressed data block that is capable of adequately store the compressed data. To do so, at 210, the block storage manager 130 reads and evaluates each of the mapping candidates.

It should be appreciated that since the uncompressed address space is larger than the compressed address space, multiple uncompressed block addresses can be mapped to the same compressed block address. However, a collision may occur when an uncompressed data is mapped to a compressed data block that does not have enough space for the new compressed data. When the collision occurs, additional data storage space is assigned for storing the new compressed data, which is described further below. In some aspects, the entire new compressed data may be stored in a reserved overflow space. In other aspects, a portion of the new compressed data is stored in the mapping candidate that has sufficient capacity to store some portion of the new compressed data, and the remaining portion of the new compressed data is stored in another compressed data block.

Accordingly, to avoid or resolve potential collisions, at 212, the block storage manager 130 read each mapping candidate and determine whether the mapping candidate has sufficient capacity to store the compressed data. If the block storage manager 130 determines that the mapping candidate has sufficient capacity to store the compressed data at operation 214, the method 200 advances to operation 216.

At 216, the block storage manager 130 selects a compressed data block from the multiple mapping candidates that has sufficient capacity and writes the compressed data in the selected compressed data block. Additionally, the block storage manager 130 further updates metadata associated with the selected compressed data block. As described above, each compressed data block is comprised of compressed data and metadata that tracks the uncompressed block addresses that are mapped to the compressed data block and the allocation information of the compressed data. For example, since the entire compressed data of the uncompressed data is stored in the selected compressed data block, a metadata entry of the compressed data block may include the uncompressed block address and a bitmap for space allocation in the compressed data block.

At 218, the block storage manager 130 writes the selected compressed data block back to a corresponding storage device. Subsequently, the method 200 may end at 220.

Figure 2:
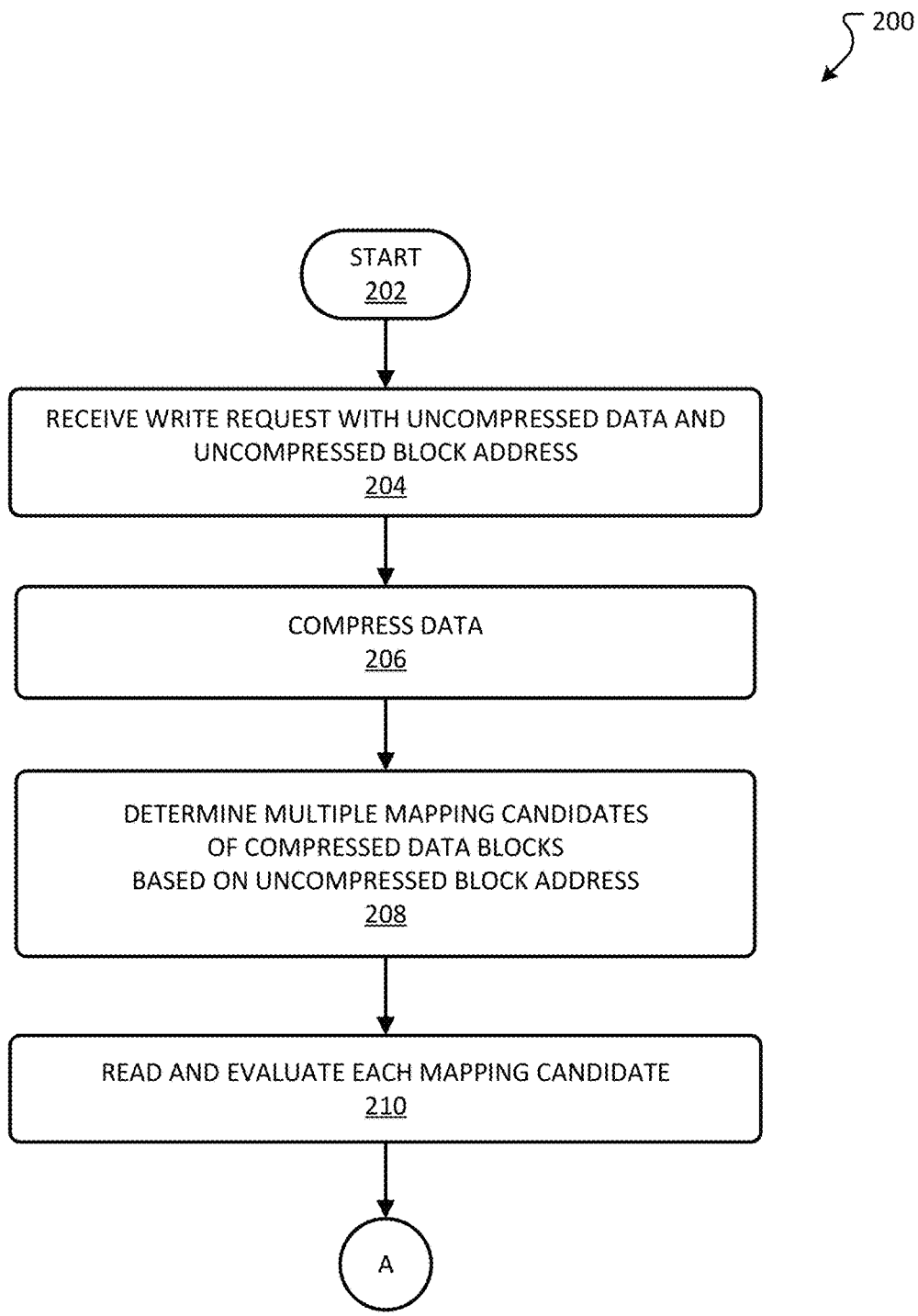
FIGS. 2A-2D depict a flowchart of an example method of writing an uncompressed data associated with an uncompressed block address to one or more block storage devices as compressed data based on the uncompressed block address in accordance with examples of the present disclosure.
Figure 2B:
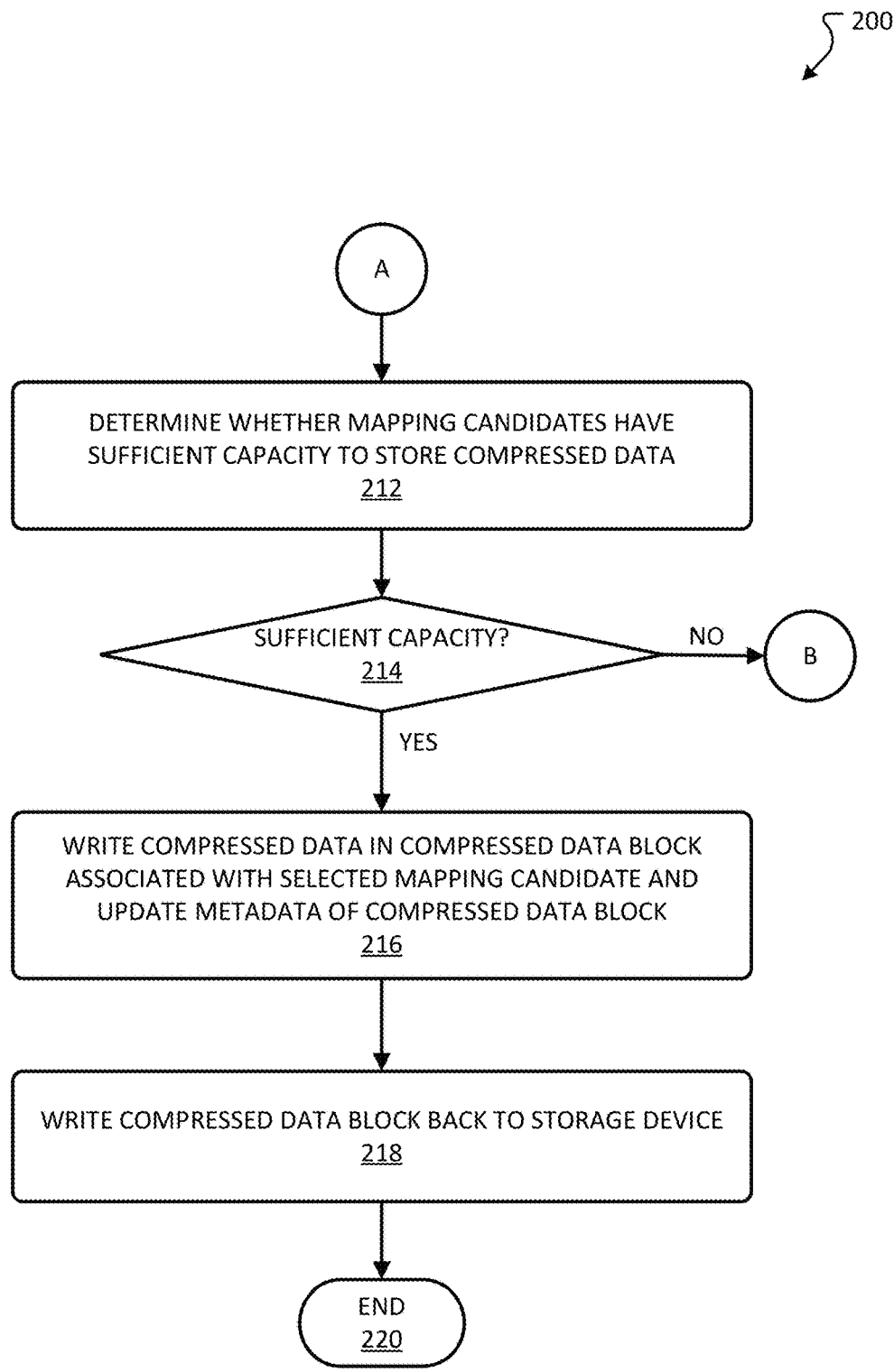
Figure 2C:
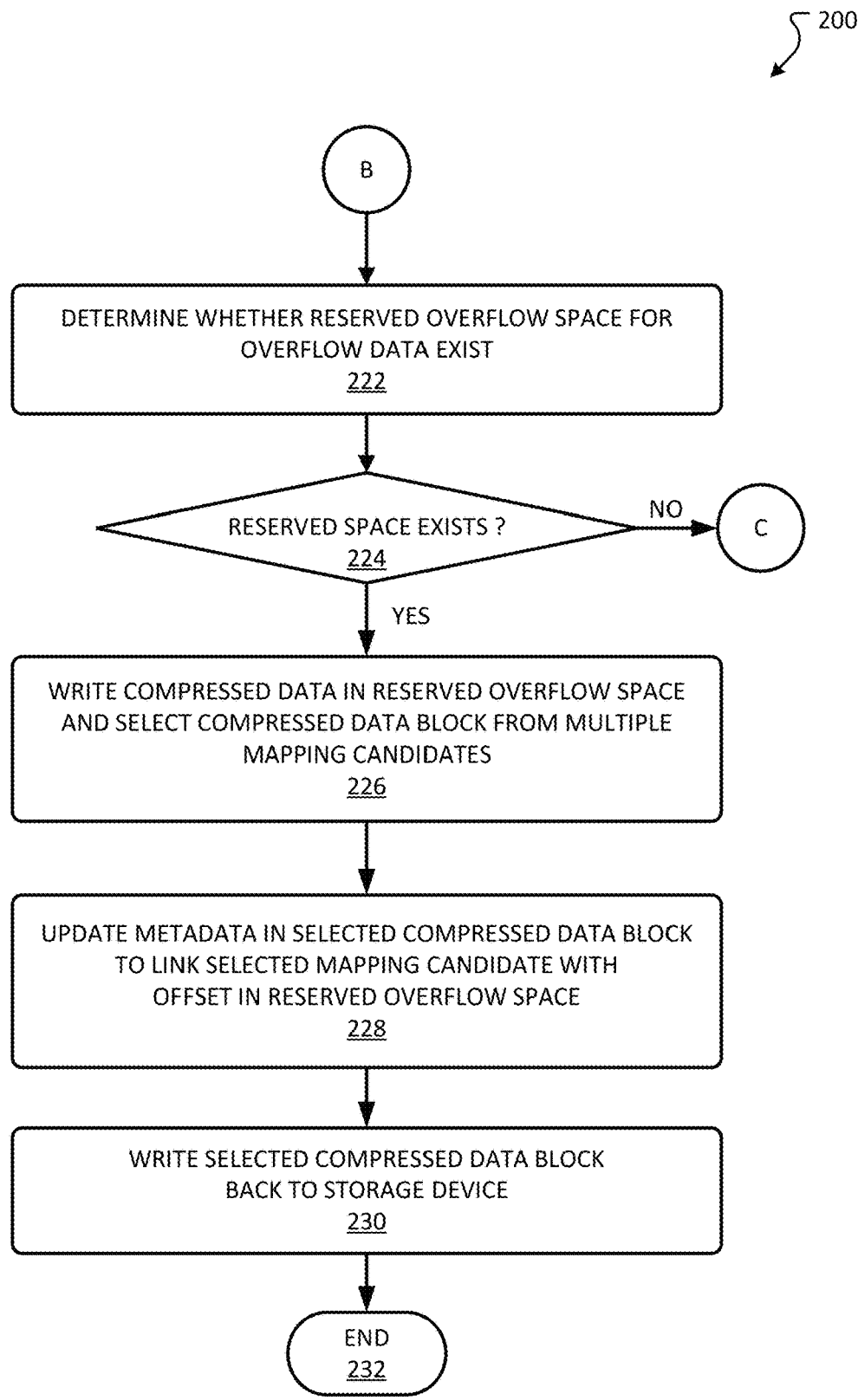

Referring back to operation 214, if the block storage manager 130 determines that all of the mapping candidates have insufficient capacity to store the compressed data, the method 200 advances to operation 222 shown in FIG. 2C.

At 222, the block storage manager 130 determines whether there is a reserved overflow area or space in the block storage devices 140 for overflow data. If the block storage manager 130 determines that the reserved space exists at 224, the method 200 proceeds to operation 226. At 226, the block storage manager 130 writes the entire compressed data of the uncompressed block address in the reserved overflow space. Additionally, the block storage manager 130 selects a compressed data block from the multiple mapping candidates to link the uncompressed block address to the reserved overflow space through the selected compressed data block. For example, the block storage manager 130 may randomly select any compressed data block from the multiple mapping candidates. Alternatively, the block storage manager 130 may select a compressed data block that has the most capacity (i.e., the most available storage) among the multiple mapping candidates.

At 228, the block storage manager 130 updates the metadata of the selected compressed data block to link the selected compressed data block with offset in the reserved overflow space. For example, as described above, the metadata of the selected compressed data block includes multiple metadata entries. A first metadata entry may include the uncompressed block address and the next metadata field pointing to a second metadata entry that includes the offset in the reserved overflow space, thereby linking the selected compressed data block with the actual offset in the reserved overflow space.

At 230, the block storage manager 130 writes the selected compressed data block back to the associated storage device. Subsequently, the method 200 may end at 232.

Figure 2D:
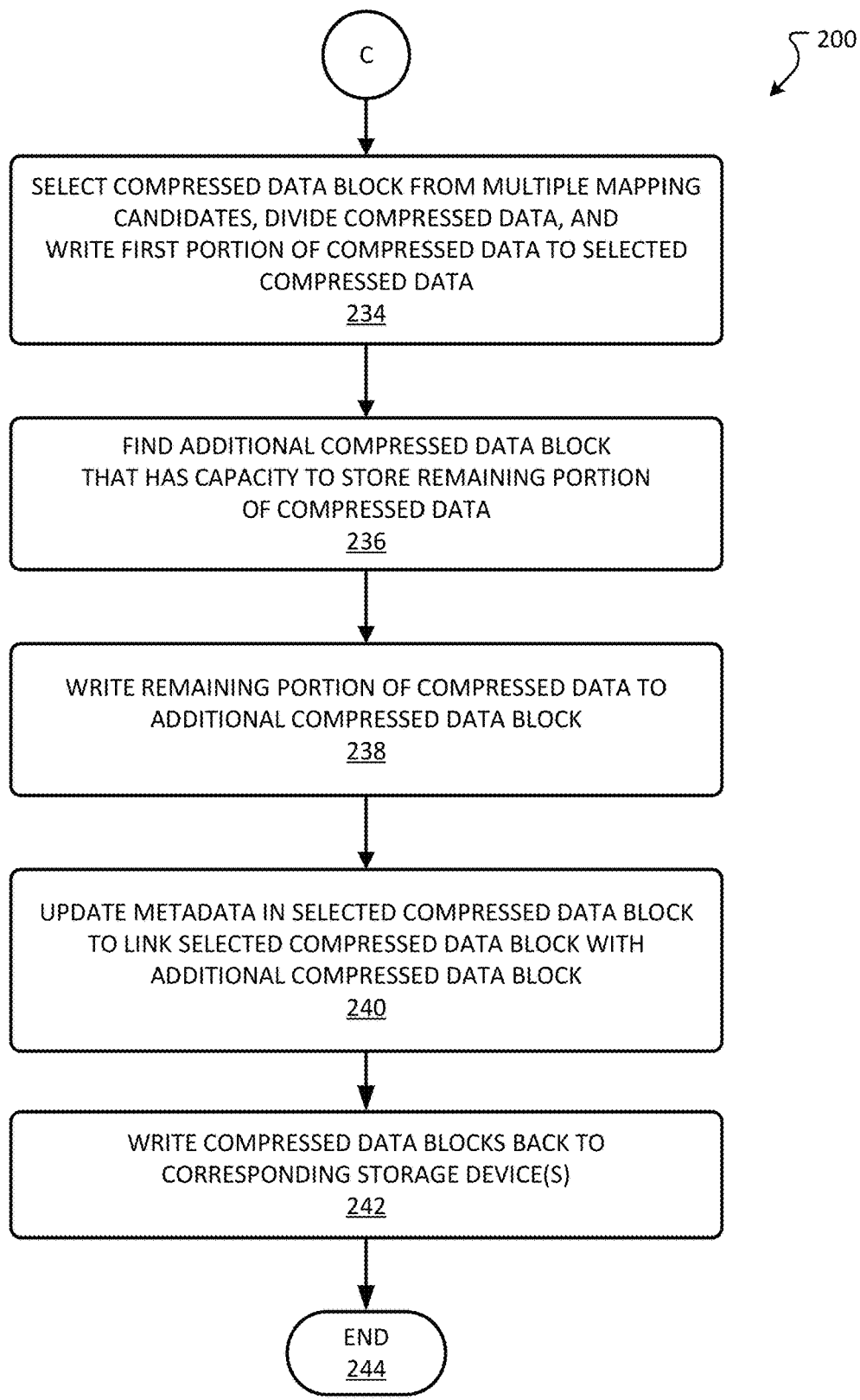

Referring back to operation 224, if the block storage manager 130 determines that the reserve overflow space does not exist or that the reserved overflow space is full, the method 200 advances to operation 234 shown in FIG. 2D. At 234, the block storage manager 130 selects a compressed data block from the multiple mapping candidates and divides the compressed data into two portions based on the available storage of the selected compressed data block. For example, the block storage manger 130 may select the mapping candidate with the most capacity (i.e., the most available storage). The block storage manager 130 then writes a first portion of the compressed data to a selected compressed data block.

Subsequently or simultaneously, the block storage manager 130 determines where to store the remaining overflow portion of the compressed data. At 236, the block storage manager 130 finds an additional compressed data block that has sufficient capacity to store the remaining portion of the compressed data. At 238, the block storage manager 130 writes the remaining overflow portion of the compressed data to the additional compressed data block.

At 240, the block storage manager 130 updates the metadata of the selected compressed data block to link the selected compressed data block with the additional compressed data block. As described above, the metadata of the compressed data block includes multiple metadata entries. A first metadata entry may include the uncompressed block address and the next metadata field pointing to a second metadata entry that includes the compressed block address of the remaining overflow portion of the compressed data, thereby linking the selected compressed data block with the additional compressed data block. Moreover, the metadata associated with the additional compressed data block is also updated to include the uncompressed block address. It should be appreciated that, in some aspects, the compressed data may be divided into multiple parts and may be stored in multiple compressed data blocks.

At 242, the block storage manager 130 writes the selected compressed data block and the additional data block back to the one or more corresponding storage devices. Subsequently, the method 200 may end at 244.

Figure 3:
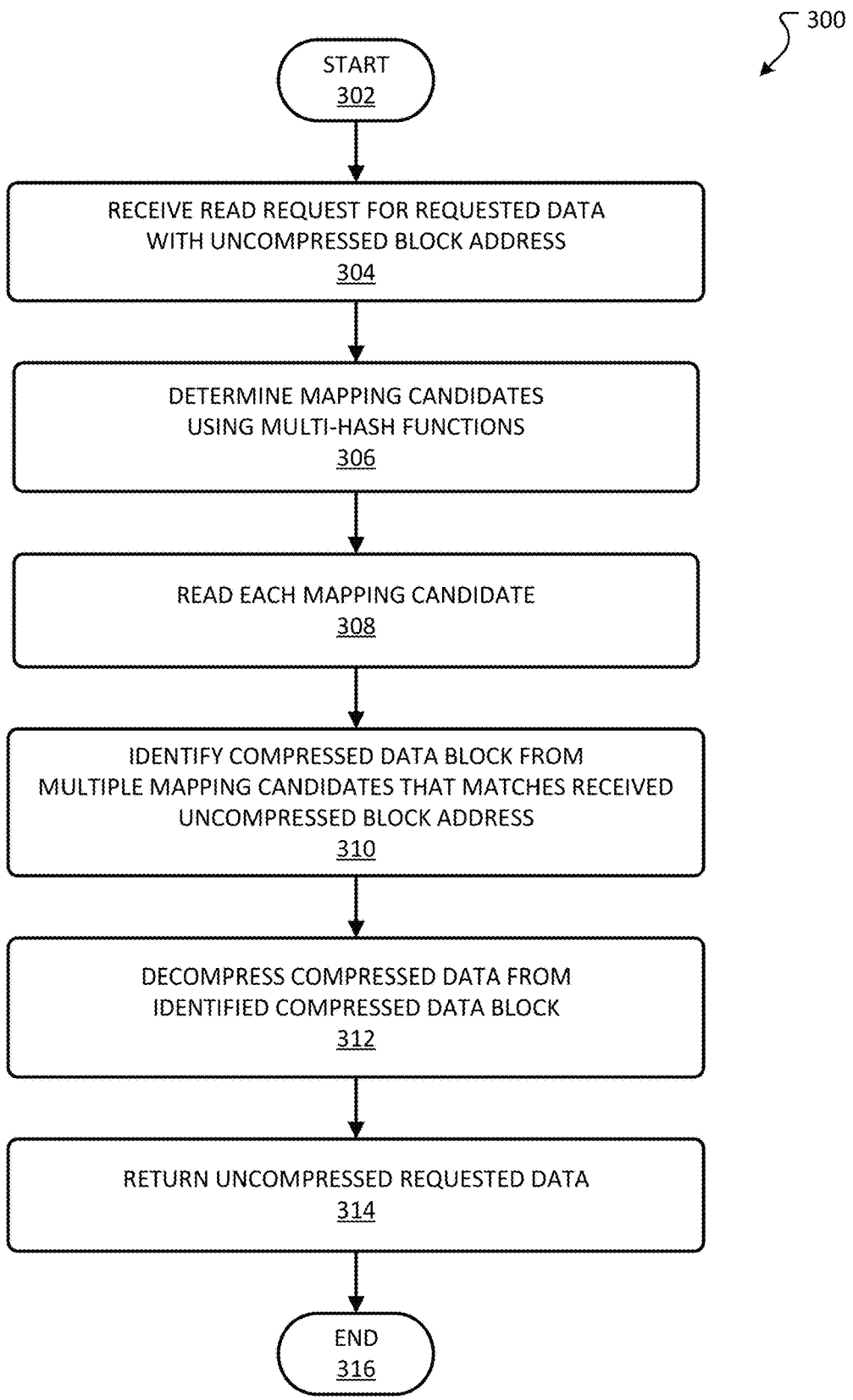
FIG. 3 depicts a flowchart of an example method of providing a requested uncompressed data by reading compressed data from one or more block storage devices based on a requested uncompressed block address in accordance with examples of the present disclosure.

Referring now to FIG. 3, a method of providing an uncompressed data by reading compressed data from one or more block storage devices based on a requested uncompressed block address in accordance with examples of the present disclosure is described. A general order for the steps of a method 300 is shown in FIG. 3. Generally, the method 300 starts at 302 and ends at 316. The method 300 may include more or fewer steps or may arrange the order of the steps differently than those shown in FIG. 3. The method 300 can be executed as a set of computer-executable instructions executed by a computer system and encoded or stored on a computer readable medium. In the illustrative aspect, the method 300 is executed by a block storage manager (e.g., 130). However, it should be appreciated that aspects of the method 300 may be performed by one or more processing devices that are capable of communicating with a host of the cloud-based block storage (e.g., the server 160) and one or more block storage devices (e.g., 144). Further, the method 300 can be performed by gates or circuits associated with a processor, Application Specific Integrated Circuit (ASIC), a field programmable gate array (FPGA), a system on chip (SOC), a neural processing unit, or other hardware device. Hereinafter, the method 300 shall be explained with reference to the systems, components, modules, software, data structures, user interfaces, etc. described in conjunction with FIGS. 1 and 4-6.

The method 300 starts at 302, where flow may proceed to 304. At 304, the block storage manager 130 receives a read request for data stored in the cloud-based block storage (e.g., 140). The read request includes an uncompressed block address associated with the requested data. As described above, the uncompressed block address is a logical block address (LBA) of the uncompressed data. For example, the block device manger 120 may receive a read request from an application running on the server 160 for data from block storage devices (e.g., 140).

At 306, the block storage manager 130 determines where the requested data is being stored. To do so, the block storage manager 130 determines multiple mapping candidates based on the uncompressed block address using multi-hash functions. As described above, the mapping candidates are compressed data blocks of the cloud-based block storage where the compressed data of the uncompressed block address may be stored.

In the illustrative embodiment, the multi-hash functions are a set of predefined hash functions that are calculated in parallel to generate multiple mapping candidates. The mapping candidates may be located on different compressed data blocks. This allows the block storage manager 130 to read and check the multiple mapping candidates in parallel, which may reduce latency. It should be appreciated that the set of predefined hash functions may be stored in a database (e.g., a hash function database 128).

At 308, the block storage manager 130 reads each of the multiple mapping candidates to determine whether a mapping candidate has the requested data that matches the uncompressed block address indicated in the read request. To do so, the block storage manager 130 may read the metadata of the compressed data block associated with each mapping candidate. As described above, the metadata includes the mapping of uncompressed block addresses to the respective compressed block. At 310, the block storage manager 130 identifies a compressed data block from the multiple mapping candidates that matches the requested uncompressed block address.

At 312, the block storage manager 130 obtains the compressed data from the identified compressed data block and decompresses the compressed data. As described above, in some examples, the compressed data may be stored in multiple locations if the identified compressed data block has insufficient capacity to store the entire compressed data. In such examples, the metadata associated with the identified compressed data block is linked to and points to either the reserved overflow space or the additional compressed data block that stores at least the portion of the compressed data. The block storage manager 130 retrieves all portions of the compressed data, merges them in the original sequence, and decompresses the compressed data to return the requested uncompressed data.

At 314, the block storage manager 130 returns the requested uncompressed data to the host of the cloud-based block storage (e.g., the server 160). The method 300 may end at 316.

Figure 4:
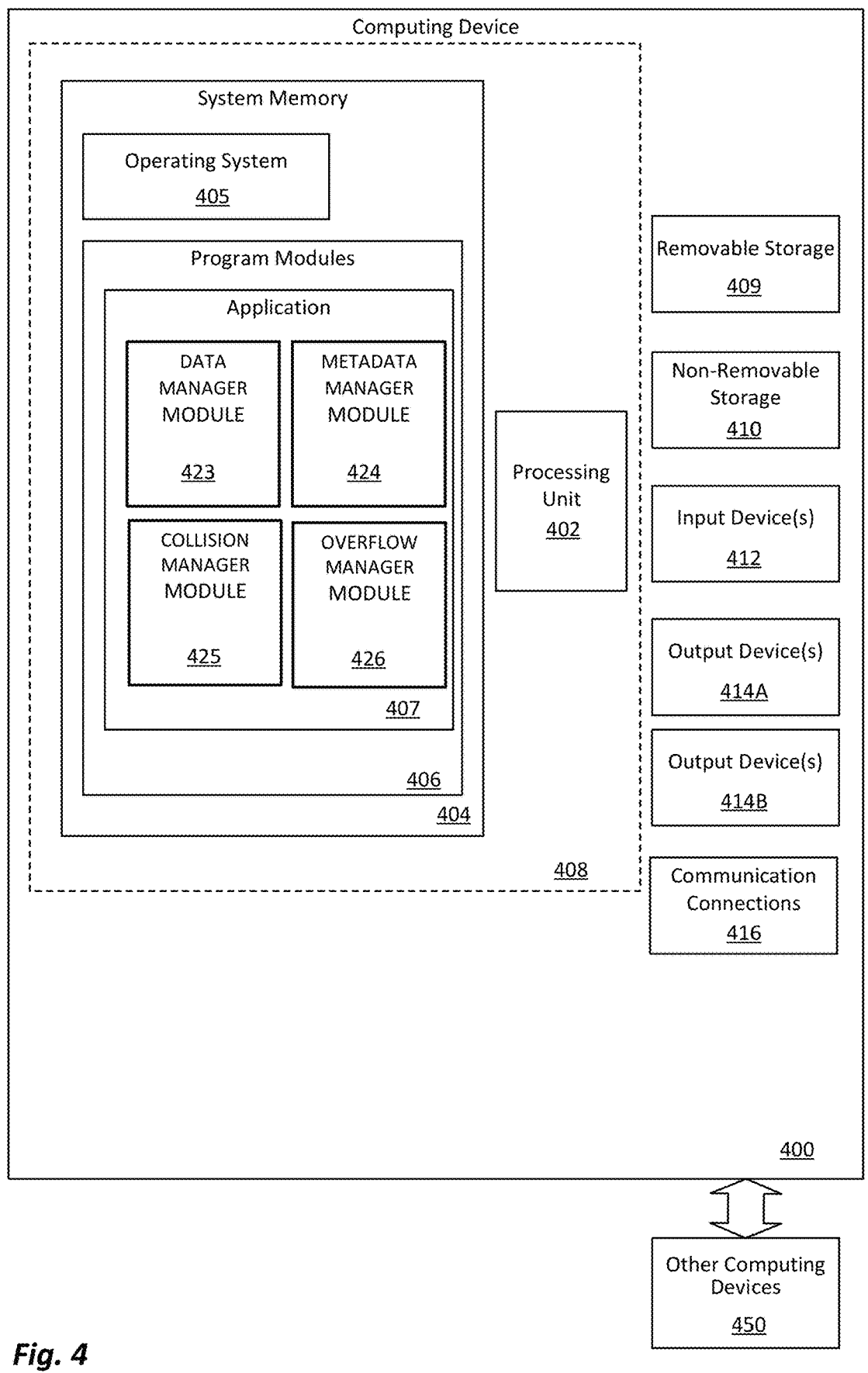
FIG. 4 depicts a block diagram illustrating physical components (e.g., hardware) of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above. For example, the computing device 400 may represent the storage management system 120 of FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for performing the various aspects disclosed herein such. The operating system 405, for example, may be suitable for controlling the operation of the computing device 400. Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, several program modules and data files may be stored in the system memory 404. While executing on the at least one processing unit 402, the program modules 406 may perform processes including, but not limited to, one or more aspects, as described herein. The application 420 includes a data manager module 423, a metadata manager module 424, a collision manager module 425, and an overflow manager module 426, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414A such as a display, speakers, a printer, etc. may also be included. An output 414B, corresponding to a virtual display may also be included. The aforementioned devices are examples and others may be used. The computing device 400 may include one or more communication connections 416 allowing communications with other computing devices 440. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
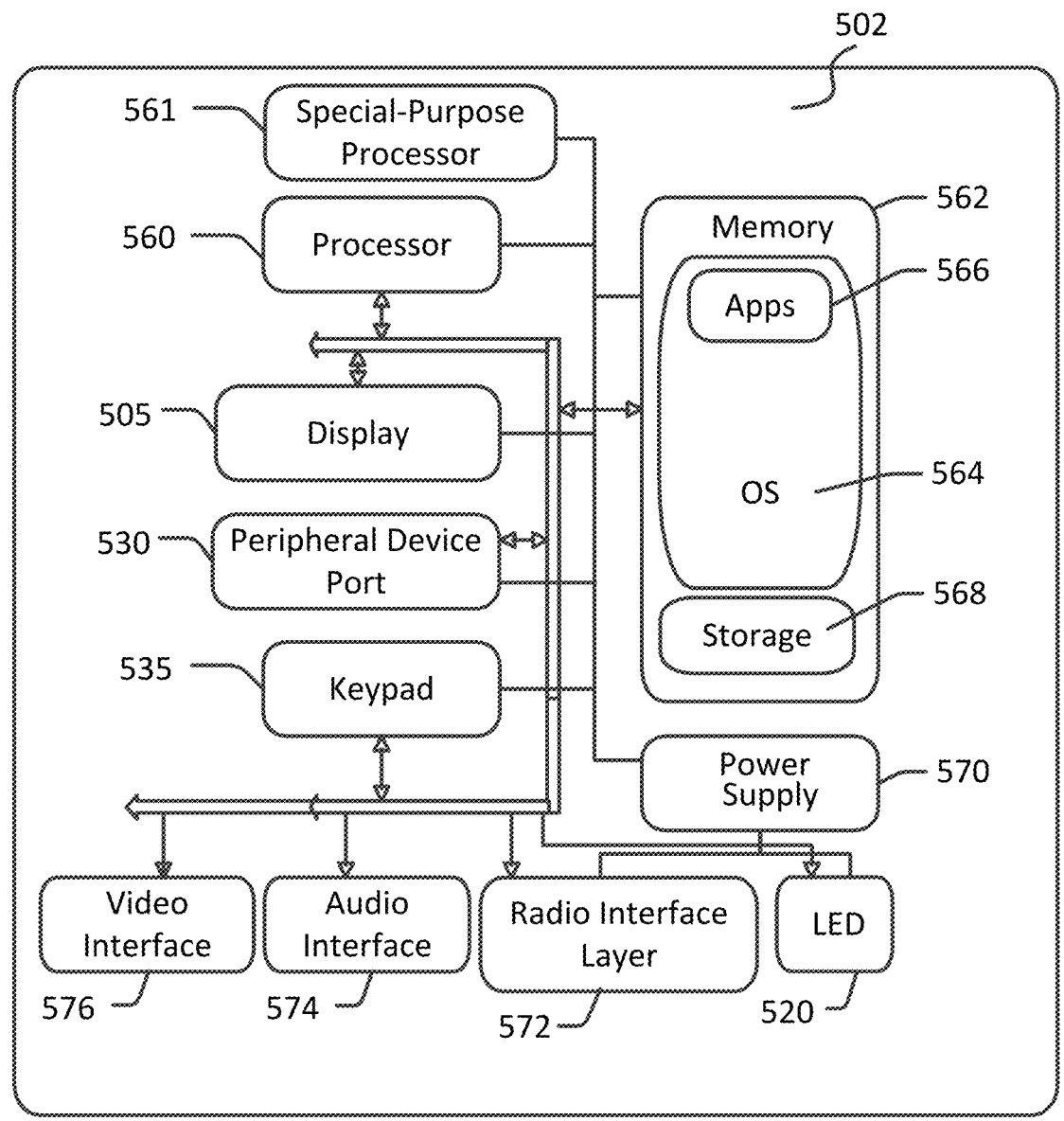
FIG. 5 illustrates an example of a computing device with which aspects of the disclosure may be practiced.

FIG. 5 is a block diagram illustrating the architecture of one aspect of computing device or a server. That is, the computing device can incorporate a system (502) (e.g., an architecture) to implement some aspects. The system 502 can implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and/or one or more components supported by the systems described herein. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the computing device described herein (e.g. a data manager module 423, a metadata manager module 424, a collision manager module 425, and an overflow manager module 426, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated configuration, the visual indicator 520 is a light emitting diode (LED) and the audio transducer 525 is a speaker. These devices may be directly coupled to the power supply 570 so that when activated, they remain on for a duration dictated by the notification mechanism even though the processor 560/561 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with aspects of the present disclosure, the microphone may also serve as an audio sensor to facilitate control of notifications, as will be described below. The system 502 may further include a video interface 576 that enables an operation of an on-board camera to record still images, video stream, and the like.

A computing device implementing the system 502 may have additional features or functionality. For example, the computing device may also include additional data storage devices (removable and/or non-removable) such as, magnetic disks, optical disks, or tape. Such additional storage is illustrated in FIG. 6 by the non-volatile storage area 568.

Data/information generated or captured by the computing device and stored via the system 502 may be stored locally on the computing device, as described above, or the data may be stored on any number of storage media that may be accessed by the device via the radio interface layer 572 or via a wired connection between the computing device and a separate computing device associated with the computing device, for example, a server computer in a distributed computing network, such as the Internet. As should be appreciated such data/information may be accessed via the computing device via the radio interface layer 572 or via a distributed computing network. Similarly, such data/information may be readily transferred between computing devices for storage and use according to well-known data/information transfer and storage means, including electronic mail and collaborative data/information sharing systems.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

(A1) In one aspect, some examples include a method for accessing block storage devices. The method includes receiving a write request including an uncompressed data and an uncompressed block address associated with the uncompressed data; generating compressed data by compressing the uncompressed data; determining a plurality of mapping candidates of compressed data blocks in the block storage devices based on the uncompressed block address; selecting a compressed data block from the plurality of mapping candidates that has sufficient capacity to store the compressed data; writing the compressed data to the selected compressed data block; updating metadata of the selected compressed data block to link the uncompressed block address to a compressed block address of the selected compressed data block; and writing the selected compressed data block back to a respective block storage device of the block storage devices.

(A2) In some examples of A1, wherein selecting the compressed data block from the multiple mapping candidates that has sufficient capacity to store the compressed data includes analyzing each compressed data block of the multiple mapping candidates to determine whether at least one compressed data block has sufficient capacity to store the compressed data; and in response to determining that the at least one compressed data block has sufficient capacity to store the compressed data, selecting a compressed data block from the at least one mapping candidate to store the compressed data (A3) In some examples of A1-A2, the method further includes, in response to determining that each compressed data block from the multiple mapping candidates has insufficient capacity to store the compressed data: dividing the compressed data into a first portion and a second portion of the compressed data; selecting a first compressed data block from the multiple mapping candidates that has the most available capacity to store the compressed data; and writing a first portion of the compressed data to a first compressed data block.

(A4) In some examples of A1-A3, the method further includes determining whether a reserved block space for overflowing data exists; in response to determining that the reserved block space exists, writing the second portion of the compressed data to the reserved block space; and updating metadata of the first compressed data block to link the reserved block space with the first compressed data block.

(A5) In some examples of A1-A4, the method further includes in response to determining that the reserved block space does not exist, identifying a second compressed data block that has capacity to store the second portion of the compressed data; in response to identifying the second compressed data block, writing the second portion of the compressed data to the additional compressed data block; and updating metadata of the first compressed data block to link the second compressed data block with the first compressed data block.

(A6) In some examples of A1-A5, wherein determining one or more mapping candidates from the uncompressed block address comprises determining one or more mapping candidates from the uncompressed block address using predefined multiple hash functions.

In yet another aspect, some examples include a computing system including one or more processors and memory coupled to the one or more processors, the memory storing one or more instructions which when executed by the one or more processors, causes the one or more processors perform any of the methods described herein (e.g., A1-A6 described above).

In yet another aspect, some examples include a non-transitory computer-readable storage medium storing one or more programs for execution by one or more processors of a storage device, the one or more programs including instructions for performing any of the methods described herein (e.g., A1-A6 described above).

(B1) In yet another aspect, some examples include a computing device for accessing block storage devices. The computing device may include a processor and a memory having a plurality of instructions stored thereon that, when executed by the processor, causes the computing device to: receive a write request including an uncompressed data and an uncompressed block address associated with the uncompressed data; generate compressed data by compressing the uncompressed data; determine a plurality of mapping candidates of compressed data blocks in the block storage devices based on the uncompressed block address; select a compressed data block from the plurality of mapping candidates that has sufficient capacity to store the compressed data; write the compressed data to the selected compressed data block; update metadata of the selected compressed data block to link the uncompressed block address to a compressed block address of the selected compressed data block; and write the selected compressed data block back to a respective block storage device of the block storage devices.

(B2) In some examples of B1, wherein to select the compressed data block from the multiple mapping candidates that has sufficient capacity to store the compressed data includes to: analyze each compressed data block of the multiple mapping candidates to determine whether at least one compressed data block has sufficient capacity to store the compressed data; and in response to determination that the at least one compressed data block has sufficient capacity to store the compressed data, select a compressed data block from the at least one mapping candidate to store the compressed data.

(B3) In some examples of B1-B2, wherein the computing device is further configured to, in response to determination that each compressed data block from the multiple mapping candidates has insufficient capacity to store the compressed data: divide the compressed data into a first portion and a second portion of the compressed data; select a first compressed data block from the multiple mapping candidates that has the most available capacity to store the compressed data; and write a first portion of the compressed data to a first compressed data block.

(B4) In some examples of B1-B3, wherein the computing device is further configured to: determine whether a reserved block space for overflowing data exists; in response to determination that the reserved block space exists, write the second portion of the compressed data to the reserved block space; and update metadata of the first compressed data block to link the reserved block space with the first compressed data block.

(B5) In some examples of B1-B4, wherein the computing device is further configured to: in response to determination that the reserved block space does not exist, identify a second compressed data block that has capacity to store the second portion of the compressed data; in response to identification of the second compressed data block, write the second portion of the compressed data to the additional compressed data block; and update metadata of the first compressed data block to link the second compressed data block with the first compressed data block.

(B6) In some examples of B1-B5, wherein to determine one or more mapping candidates from the uncompressed block address comprises to determine one or more mapping candidates from the uncompressed block address using predefined multiple hash functions.

(C1) In one aspect, some examples include a non-transitory computer-readable medium storing instructions for accessing block storage devices, the instructions when executed by one or more processors of a computing device, cause the computing device to: receive a write request including an uncompressed data and an uncompressed block address associated with the uncompressed data; generate compressed data by compressing the uncompressed data; determine a plurality of mapping candidates of compressed data blocks in the block storage devices based on the uncompressed block address; select a compressed data block from the plurality of mapping candidates that has sufficient capacity to store the compressed data; write the compressed data to the selected compressed data block; update metadata of the selected compressed data block to link the uncompressed block address to a compressed block address of the selected compressed data block; and write the selected compressed data block back to a respective block storage device of the block storage devices.

(C2) In some examples of C1, wherein to select the compressed data block from the multiple mapping candidates that has sufficient capacity to store the compressed data includes to: analyze each compressed data block of the multiple mapping candidates to determine whether at least one compressed data block has sufficient capacity to store the compressed data; and in response to determination that the at least one compressed data block has sufficient capacity to store the compressed data, select a compressed data block from the at least one mapping candidate to store the compressed data.

(C3) In some examples of C1-C2, wherein the instructions when executed by the one or more processors further cause the computing device to: divide the compressed data into a first portion and a second portion of the compressed data; select a first compressed data block from the multiple mapping candidates that has the most available capacity to store the compressed data; and write a first portion of the compressed data to a first compressed data block.

(C4) In some examples of C1-C3, wherein the instructions when executed by the one or more processors further cause the computing device to: determine whether a reserved block space for overflowing data exists; in response to determination that the reserved block space exists, write the second portion of the compressed data to the reserved block space; and update metadata of the first compressed data block to link the reserved block space with the first compressed data block.

(C5) In some examples of C1-C4, wherein the instructions when executed by the one or more processors further cause the computing device to: in response to determination that the reserved block space does not exist, identify a second compressed data block that has capacity to store the second portion of the compressed data; in response to identification of the second compressed data block, write the second portion of the compressed data to the additional compressed data block; and update metadata of the first compressed data block to link the second compressed data block with the first compressed data block.

(C6) In some examples of C1-C5, wherein to determine one or more mapping candidates from the uncompressed block address comprises to determine one or more mapping candidates from the uncompressed block address using predefined multiple hash functions.

(C7) In some examples of C1-C6, wherein to select a compressed data block from the plurality of mapping candidates includes to evaluate each of the plurality of mapping candidates simultaneously.

(C8) In some examples of C1-C7, wherein the metadata of the selected compressed data block is configured to track uncompressed block addresses that are mapped to the selected compressed data block and allocation information of the compressed data.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for accessing block storage devices, the method comprising:
   receiving a write request including an uncompressed data and an uncompressed block address associated with the uncompressed data, wherein the uncompressed block address is a logical block address (LBA) where the uncompressed data is stored;
   generating compressed data by compressing the uncompressed data;
   determining a plurality of mapping candidates of compressed data blocks in the block storage devices based on the uncompressed block address;
   selecting a compressed data block from the plurality of mapping candidates that has sufficient capacity to store the compressed data;
   writing the compressed data to the selected compressed data block of a respective block storage device of the block storage devices;
   updating metadata of the selected compressed data block to link the uncompressed block address to a compressed block address of the selected compressed data block;
   receiving a read request including the uncompressed block address;
   reading metadata of each of the plurality of mapping candidates of compressed data blocks in parallel; and
   identifying the compressed data block from the plurality of mapping candidates based on the metadata of each of the mapping candidates of compressed data blocks,
   wherein the selected compressed data block comprises the compressed data and the metadata that tracks the uncompressed block address being mapped to the selected compressed data block and allocation information of the compressed data, and the metadata is stored in the selected compressed data block.

2. The method of claim 1, wherein selecting the compressed data block from the multiple mapping candidates that has sufficient capacity to store the compressed data includes:
   analyzing each compressed data block of the multiple mapping candidates to determine whether at least one compressed data block has sufficient capacity to store the compressed data; and
   in response to determining that the at least one compressed data block has sufficient capacity to store the compressed data, selecting a compressed data block from the at least one mapping candidate to store the compressed data.

3. The method of claim 2, further comprising, in response to determining that each compressed data block from the multiple mapping candidates has insufficient capacity to store the compressed data:
   dividing the compressed data into a first portion and a second portion of the compressed data;
   selecting a first compressed data block from the multiple mapping candidates that has the most available capacity to store the compressed data; and
   writing a first portion of the compressed data to a first compressed data block.

4. The method of claim 3, further comprising:
   determining whether a reserved block space for overflowing data exists;
   in response to determining that the reserved block space exists, writing the second portion of the compressed data to the reserved block space; and
   updating metadata of the first compressed data block to link the reserved block space with the first compressed data block.

5. The method of claim 4, further comprising:
   in response to determining that the reserved block space does not exist, identifying a second compressed data block that has capacity to store the second portion of the compressed data;
   in response to identifying the second compressed data block, writing the second portion of the compressed data to the additional compressed data block; and
   updating metadata of the first compressed data block to link the second compressed data block with the first compressed data block.

6. The method of claim 1, wherein determining one or more mapping candidates from the uncompressed block address comprises determining one or more mapping candidates from the uncompressed block address using predefined multiple hash functions.

7. A computing device for accessing block storage devices, the computing device comprising:
   a processor; and
   a memory having a plurality of instructions stored thereon that, when executed by the processor, causes the computing device to:
   receive a write request including an uncompressed data and an uncompressed block address associated with the uncompressed data, wherein the uncompressed block address is a logical block address (LBA) where the uncompressed data is stored;
   generate compressed data by compressing the uncompressed data;
   determine a plurality of mapping candidates of compressed data blocks in the block storage devices based on the uncompressed block address;
   select a compressed data block from the plurality of mapping candidates that has sufficient capacity to store the compressed data;
   write the compressed data to the selected compressed data block of a respective block storage device of the block storage devices; and update metadata of the selected compressed data block to link the uncompressed block address to a compressed block address of the selected compressed data block;
receive a read request including the uncompressed block address;
reading metadata of each of the plurality of the mapping candidates of compressed data blocks in parallel; and
identify the compressed data block from the plurality of mapping candidates based on the metadata of each of the mapping candidates of compressed data blocks,
wherein the selected compressed data block comprises the compressed data and the metadata that tracks the uncompressed block address being mapped to the selected compressed data block and allocation information of the compressed data, and the metadata is stored in the selected compressed data block.

8. The computing device of claim 7, wherein to select the compressed data block from the multiple mapping candidates that has sufficient capacity to store the compressed data includes to:
analyze each compressed data block of the multiple mapping candidates to determine whether at least one compressed data block has sufficient capacity to store the compressed data; and
in response to determination that the at least one compressed data block has sufficient capacity to store the compressed data, select a compressed data block from the at least one mapping candidate to store the compressed data.

9. The computing device of claim 8, wherein the computing device is further configured to, in response to determination that each compressed data block from the multiple mapping candidates has insufficient capacity to store the compressed data:
divide the compressed data into a first portion and a second portion of the compressed data;
select a first compressed data block from the multiple mapping candidates that has the most available capacity to store the compressed data; and
write a first portion of the compressed data to a first compressed data block.

10. The computing device of claim 9, wherein the computing device is further configured to:
determine whether a reserved block space for overflowing data exists;
in response to determination that the reserved block space exists, write the second portion of the compressed data to the reserved block space; and
update metadata of the first compressed data block to link the reserved block space with the first compressed data block.

11. The computing device of claim 10, wherein the computing device is further configured to:
in response to determination that the reserved block space does not exist, identify a second compressed data block that has capacity to store the second portion of the compressed data;
in response to identification of the second compressed data block, write the second portion of the compressed data to the additional compressed data block; and
update metadata of the first compressed data block to link the second compressed data block with the first compressed data block.

12. The computing device of claim 7, wherein to determine one or more mapping candidates from the uncompressed block address comprises to determine one or more mapping candidates from the uncompressed block address using predefined multiple hash functions.

13. A non-transitory computer-readable medium storing instructions for accessing block storage devices, the instructions when executed by one or more processors of a computing device, cause the computing device to:
receive a write request including an uncompressed data and an uncompressed block address associated with the uncompressed data, wherein the uncompressed block address is a logical block address (LBA) where the uncompressed data is stored;
generate compressed data by compressing the uncompressed data;
determine a plurality of mapping candidates of compressed data blocks in the block storage devices based on the uncompressed block address;
select a compressed data block from the plurality of mapping candidates that has sufficient capacity to store the compressed data;
write the compressed data to the selected compressed data block of a respective block storage device of the block storage devices; and
update metadata of the selected compressed data block to link the uncompressed block address to a compressed block address of the selected compressed data block;
receive a read request including the uncompressed block address;
reading metadata of each of the plurality of the mapping candidates of compressed data blocks in parallel; and
identify the compressed data block from the plurality of mapping candidates based on the metadata of each of the mapping candidates of compressed data blocks,
wherein the selected compressed data block comprises the compressed data and the metadata that tracks the uncompressed block address being mapped to the selected compressed data block and allocation information of the compressed data, and the metadata is stored in the selected compressed data block.

14. The non-transitory computer-readable medium of claim 13, wherein to select the compressed data block from the multiple mapping candidates that has sufficient capacity to store the compressed data includes to:
analyze each compressed data block of the multiple mapping candidates to determine whether at least one compressed data block has sufficient capacity to store the compressed data; and
in response to determination that the at least one compressed data block has sufficient capacity to store the compressed data, select a compressed data block from the at least one mapping candidate to store the compressed data.

15. The non-transitory computer-readable medium of claim 14, wherein the instructions when executed by the one or more processors further cause the computing device to
divide the compressed data into a first portion and a second portion of the compressed data;
select a first compressed data block from the multiple mapping candidates that has the most available capacity to store the compressed data; and
write a first portion of the compressed data to a first compressed data block.

16. The non-transitory computer-readable medium of claim 15, wherein the instructions when executed by the one or more processors further cause the computing device to:
determine whether a reserved block space for overflowing data exists;

in response to determination that the reserved block space exists, write the second portion of the compressed data to the reserved block space; and update metadata of the first compressed data block to link the reserved block space with the first compressed data block.

17. The non-transitory computer-readable medium of claim 16, wherein the instructions when executed by the one or more processors further cause the computing device to:

in response to determination that the reserved block space does not exist, identify a second compressed data block that has capacity to store the second portion of the compressed data;

in response to identification of the second compressed data block, write the second portion of the compressed data to the additional compressed data block; and update metadata of the first compressed data block to link the second compressed data block with the first compressed data block.

18. The non-transitory computer-readable medium of claim 13, wherein to determine one or more mapping candidates from the uncompressed block address comprises to determine one or more mapping candidates from the uncompressed block address using predefined multiple hash functions.

19. The non-transitory computer-readable medium of claim 13, wherein to select a compressed data block from the plurality of mapping candidates includes to evaluate each of the plurality of mapping candidates simultaneously.

* * * * *